United States Patent [19]
Woodcox

[11] Patent Number: 5,621,958
[45] Date of Patent: Apr. 22, 1997

[54] BRAKE ELEMENT PROCESSING DEVICE AND METHOD

[76] Inventor: Gordon G. Woodcox, R.R.#3 Cavan, Ontario, Canada, L0A 1C0

[21] Appl. No.: 381,186

[22] Filed: Jan. 31, 1995

[51] Int. Cl.$^6$ .................................................. B21J 15/50
[52] U.S. Cl. .......................... 29/426.4; 29/426.5; 29/233
[58] Field of Search ............................... 29/426.4, 426.5, 29/403.3, 412, 233, 243.53, 252

[56] References Cited

U.S. PATENT DOCUMENTS

| | | |
|---|---|---|
| 2,711,775 | 6/1955 | Batchelor et al. . |
| 3,289,285 | 12/1966 | Conklin . |
| 4,065,843 | 1/1978 | Elola . |
| 4,287,652 | 9/1981 | Epperly . |
| 4,312,107 | 1/1982 | White . |
| 4,365,401 | 12/1982 | Ogren ................................... 29/243.53 |
| 5,008,995 | 4/1991 | Johnson . |
| 5,040,278 | 8/1991 | Eckold et al. . |
| 5,042,129 | 8/1991 | Seccombe . |
| 5,177,849 | 1/1993 | Johnson . |

FOREIGN PATENT DOCUMENTS 6-198380A  7/1994  Japan ........................................ 29/233

*Primary Examiner*—David P. Bryant
*Attorney, Agent, or Firm*—Thomas A. O'Rourke

[57] ABSTRACT

Disclosed herein is a device for processing a brake element having a frame supporting a fixture for locating a brake element. The brake element has an inner concave surface and an outer convex surface. The fixture has a first surface to engage the inner concave surface. A clamp arrangement removably clamps the brake element to the fixture which has a plurality of rivet extraction elements, each being arranged to align with a corresponding rivet in the brake element. The fixture has a second surface and a cam element is provided with a cam surface adjacent to the second surface and the rivet extraction elements are arranged to engage the cam means at the second surface.

18 Claims, 11 Drawing Sheets

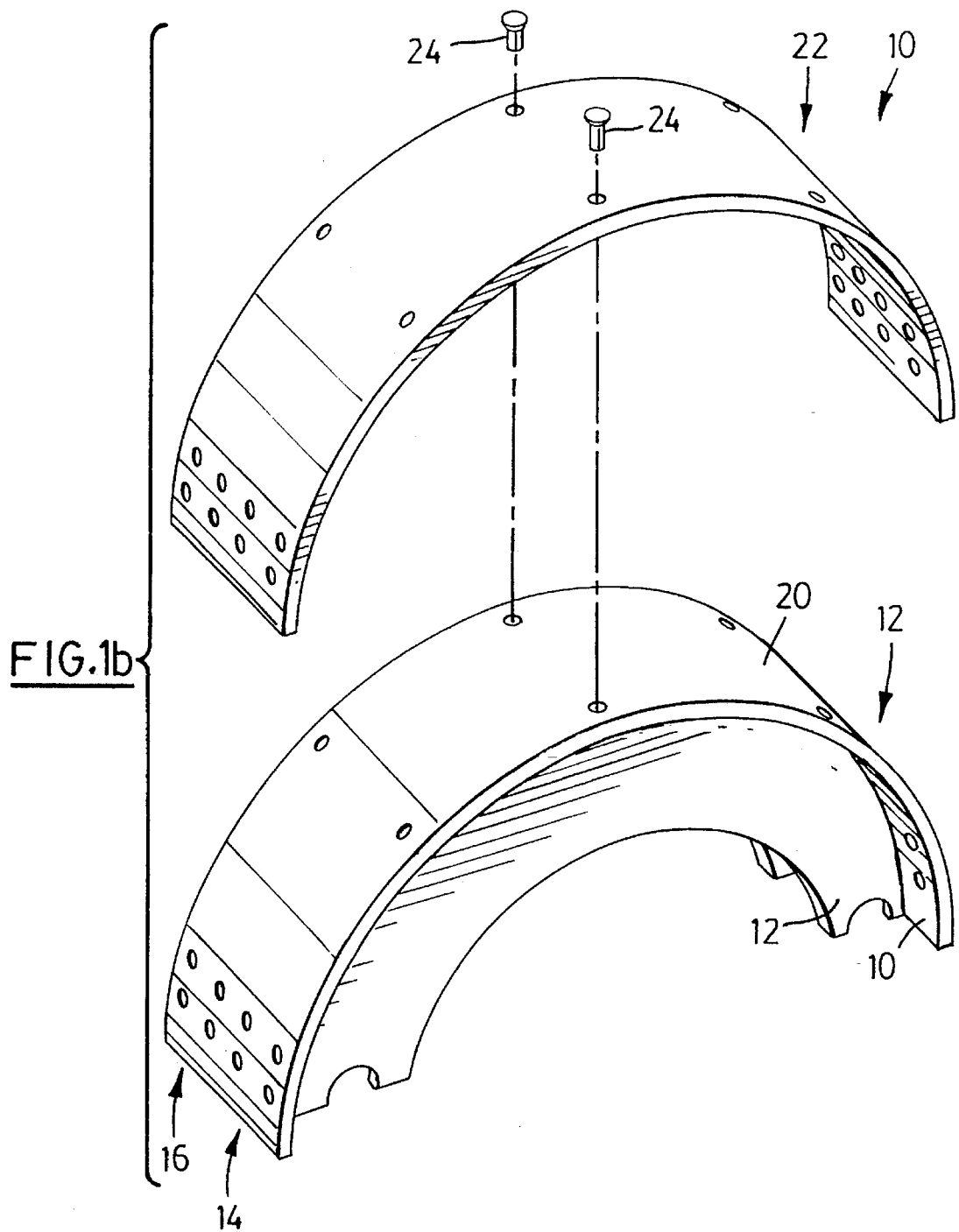

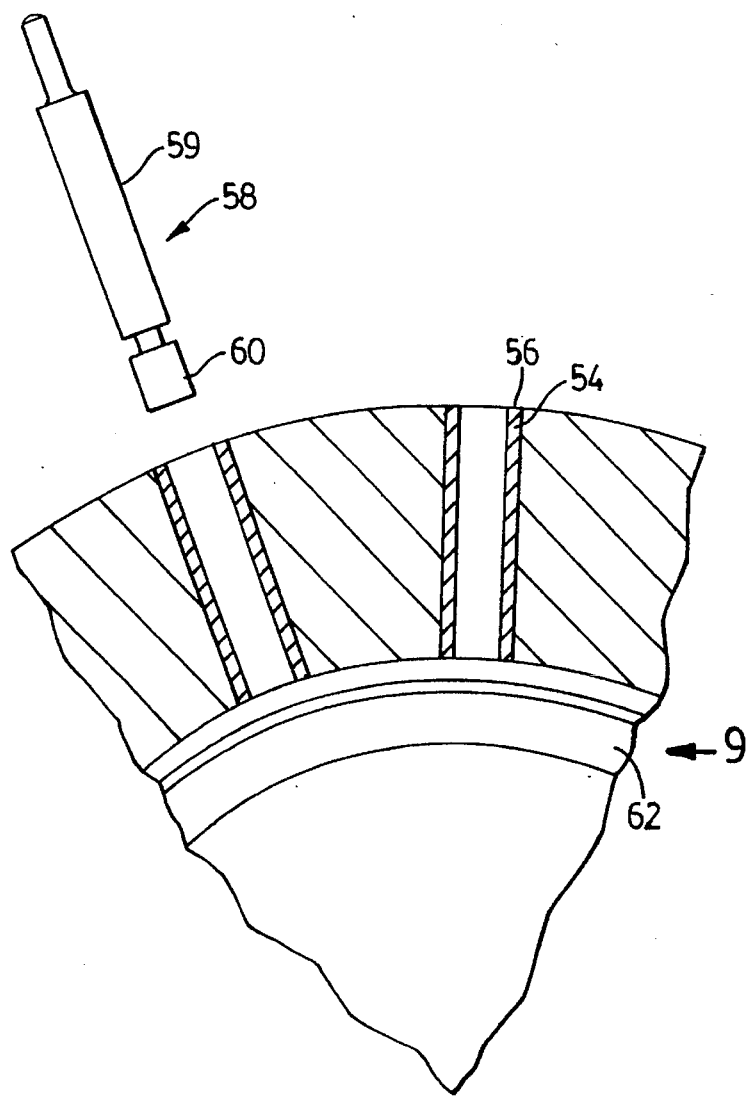
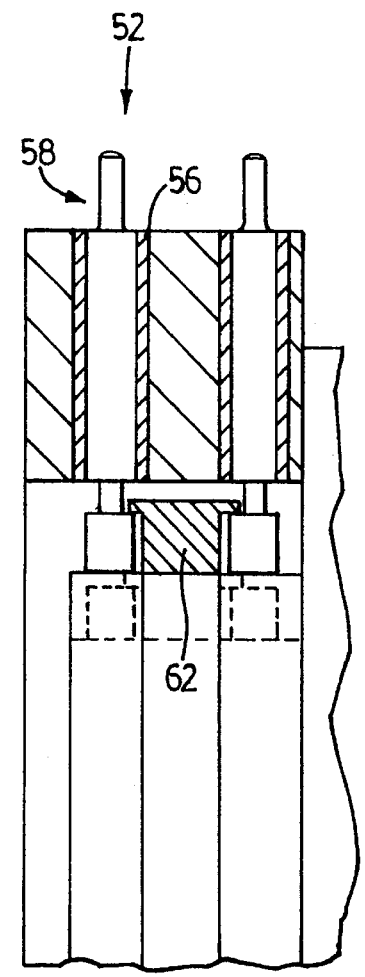
FIG. 8
FIG. 9

5,621,958

BRAKE ELEMENT PROCESSING DEVICE AND METHOD

BACKGROUND OF THE INVENTION

1. Field of the Invention

The present invention relates to brake elements and more particularly to a method of removing a brake lining therefrom.

2. Description of the Related Art

As the number of vehicles on our highways continues to grow, so will the demand for replacement auto parts including brake shoes used with drum brakes and brake pads used with disc brakes. Brake shoes and pads are well known and have a base plate with a lining rivetted or otherwise bonded thereto. The lining progressively wears down until such time as the brake shoes and pads have to be replaced. The auto industry has for years recycled brake shoes and pads by replacing the old linings with new ones. However, the process to remove these linings has been uneconomical, time consuming and awkward.

It is an object of the present invention to provide a novel device for removing the lining from brake elements.

SUMMARY OF THE INVENTION

Briefly stated, the invention involves a device for removing the lining from a brake element, comprising:

frame means, fixture means supported by the frame means for locating a brake element, the brake element having an inner concave surface and an outer convex surface, the fixture means having a first surface to engage the inner concave surface;

clamping means for removably clamping the brake element to the fixture means;

the fixture means further comprising a plurality of rivet extraction means, each of the rivet extraction means being arranged to align with a corresponding rivet in the brake element, the fixture means further comprising a second surface, cam means providing a cam surface adjacent the second surface, the rivet extraction means being arranged to engage the cam means at the second surface.

In another aspect of the present invention, there is provided a technique for processing a brake element, comprising the steps of:

providing a frame, supporting a fixture by the frame for locating a brake element, the brake element having an inner concave surface and an outer convex surface, providing the fixture with a first surface to engage the inner concave surface;

removably clamping the brake element to the fixture;

providing in the fixture a plurality of rivet extraction elements, and arranging the extraction elements to align with a corresponding rivet in the brake element, providing the fixture with a second surface, providing a cam element with a cam surface adjacent the second surface, and arranging the rivet extraction elements to engage the cam means at the second surface, thereby to extract the rivets from the brake element.

BRIEF DESCRIPTION OF THE DRAWINGS

A preferred embodiment of the present invention will now be described, by way of example only, with reference to the appended drawings in which:

FIG. 1b is an exploded perspective view of a brake element;

FIG. 8 is a fragmentary sectional view of yet another portion of the device illustrated in FIG. 1; and FIG. 9 is a view taken on arrow 9 of FIG. 8.

DESCRIPTION OF THE PREFERRED EMBODIMENTS

Figure 1:
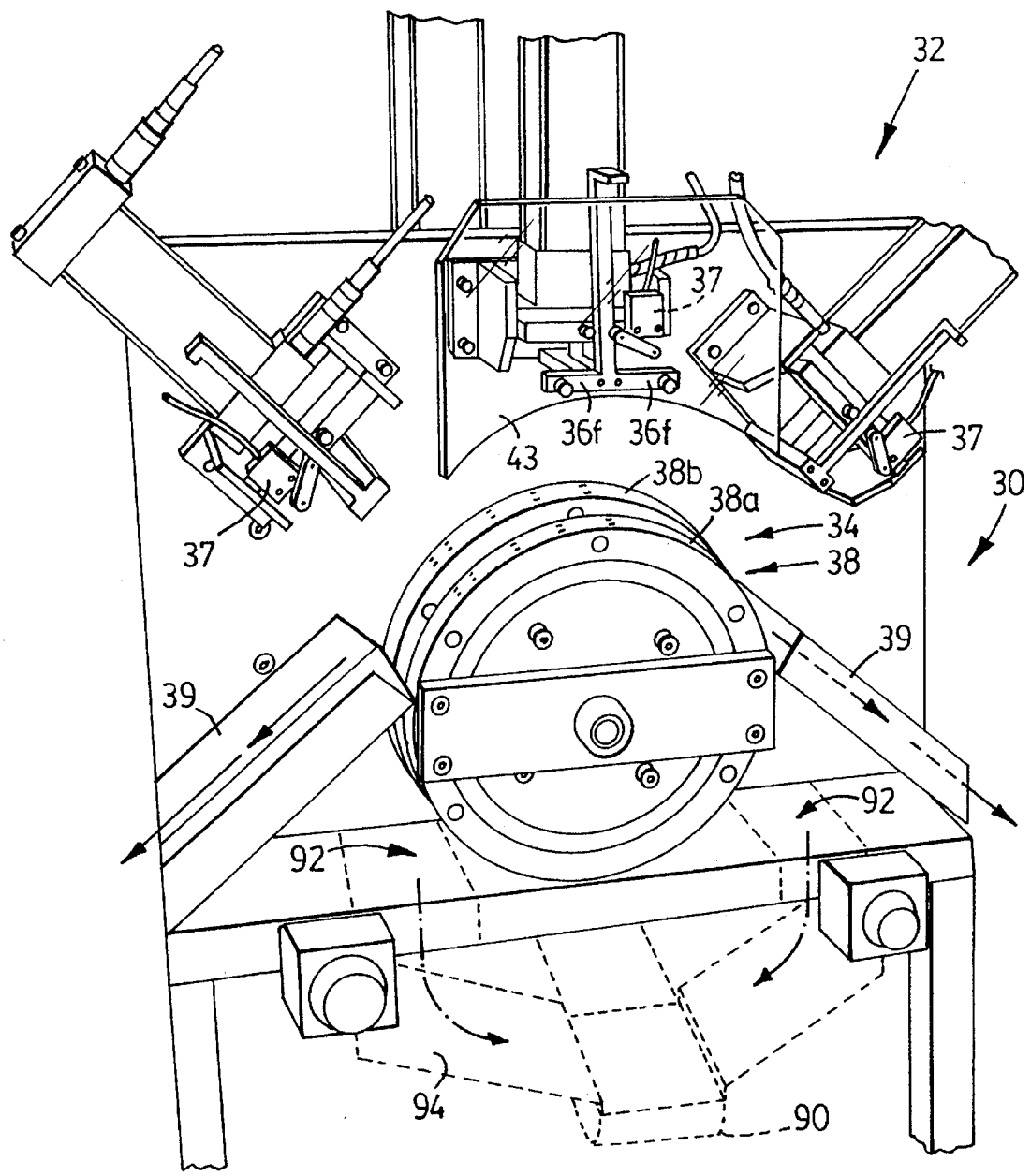
FIG. 1 is a fragmentary perspective view of a brake element processing device.

Before discussing the preferred embodiment, it would be useful to describe the typical brake element, such as a brake shoe 10 as illustrated in FIG. 1b, As can be seen, the brake shoe 10 has a central web portion 12 and two outer rivet-containing shoe portions 14, 16 each on a corresponding side of the web portion 12, along with an inner concave surface 18 and an outer convex surface 20. A brake lining 22 is attached to the shoe portions 14, 16 by way of rivets 24. The pattern of the rivets of course will vary with the type of brake shoe and the manufacturer thereof.

Referring to the figures, there is provided a device 30 for removing the brake lining from a brake element, such as a brake shoe 10. The device 30 has a frame means in the form of a frame assembly shown generally at 32. A fixture means 34 is supported by the frame means and is provided to locate a brake shoe 10. Clamping means in the form of three hydraulic rams 36 are provided for removably clamping the brake shoe 10 to the fixture means. The rams are arranged at the two, twelve and ten o'clock positions in order to engage the end regions and the central region of the brake shoe.

Figure 5:
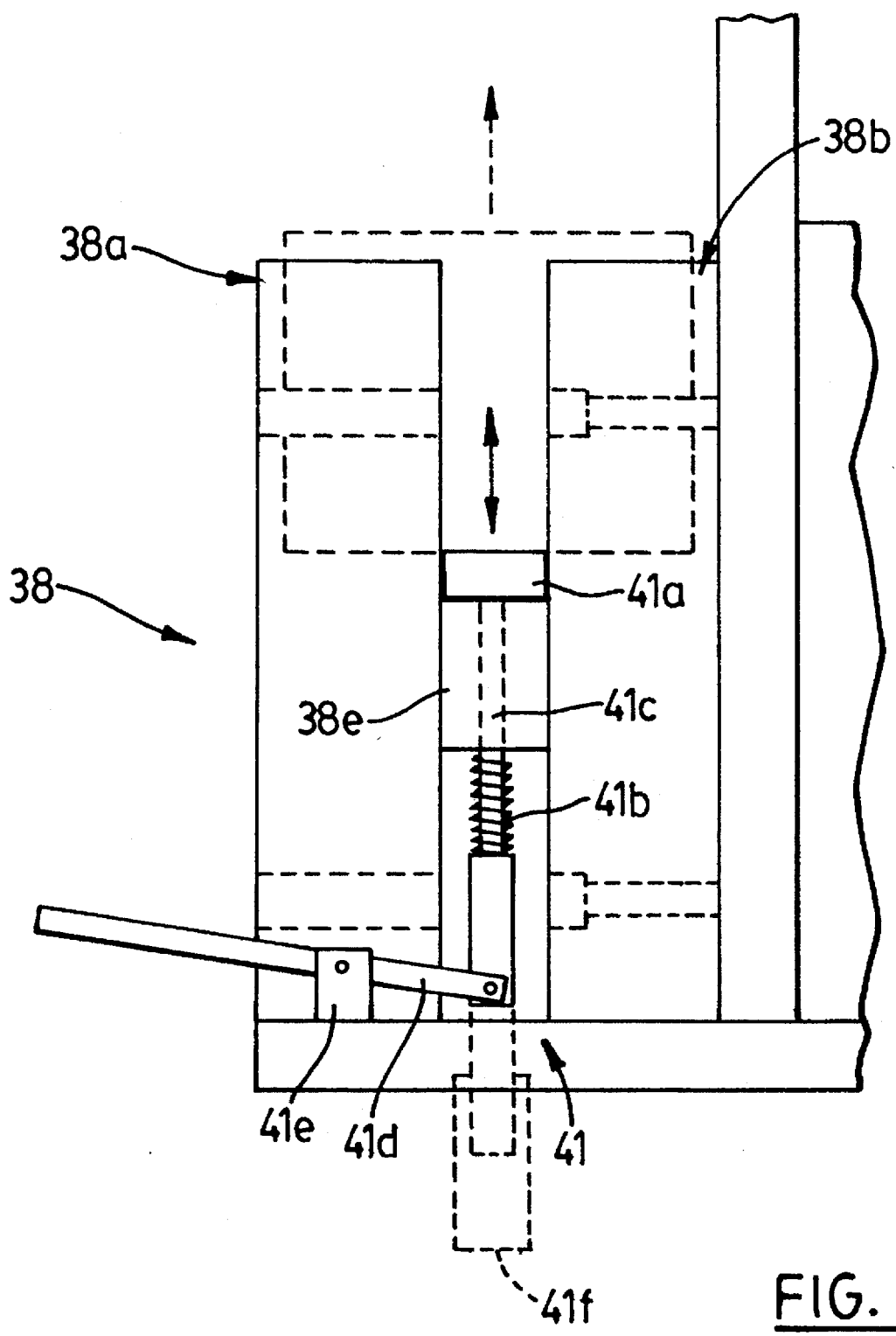
FIG. 5 is a fragmentary sectional view of a portion of the device illustrated in FIG. 1.

Referring to FIG. 5, the fixture means is in the form of an arcuate fixture member, as part of a cylindrical fixture assembly 38 with a pair of cylindrical portions 38a, 38b joined by a pair of blocks shown at 38e in FIG. 5 thereby to form a gap between the portions to accommodate the central web portion 12 of the brake shoe.

One of the blocks 38e is also equipped with a shoe ejection mechanism 41 having a ejection block 41a joined to a piston 41b itself slidably mounted in a passage 41c in the block 38e. A spring biases the piston downwardly and the lower end of the piston is pivoted to a link 41d which in turn is pivoted to a yoke 41e thereby to provide a free end that is downwardly movable to displace the block upwardly to eject the brake shoe. If desired, the shoe ejection mechanism may be automated by way of a solenoid shown in phantom at 41f in place of line 41e.

Figure 1A:
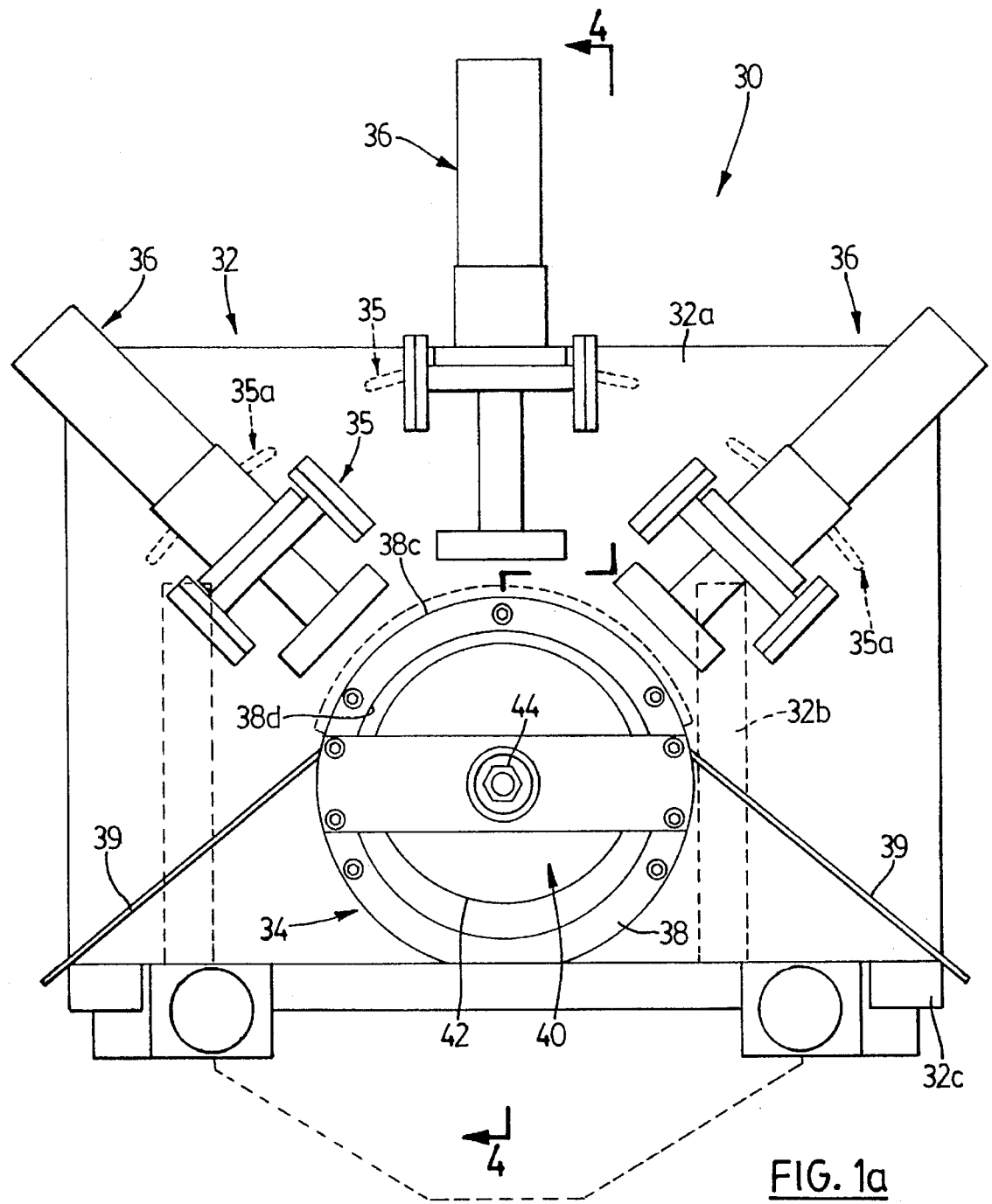
FIG. 1a is a front view of the device illustrated in FIG. 1.

Referring to FIG. 1a, each portion 38a, 38b of the fixture assembly 38 has a rectangular cross section and with a first surface 38c to engage the inner concave surface 18 of the brake lining and a second surface 38d. Located on opposite sides of the fixture assembly are reject chutes 39 to transfer the remains of the removed lining away from the remaining brake shoe.

Figure 7:
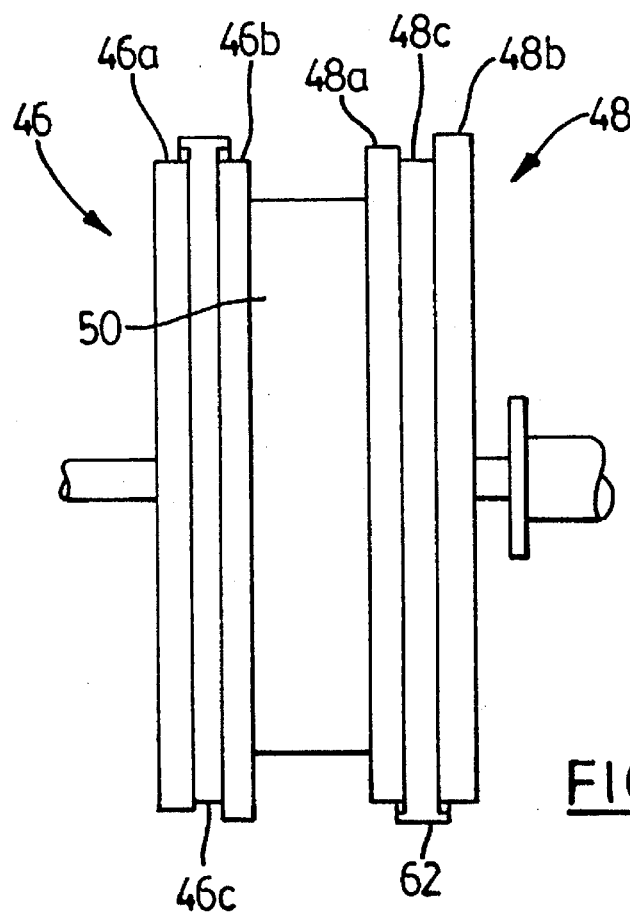
FIG. 7 is a fragmentary side view of yet another portion of the device illustrated in FIG.1.
Figure 7A:
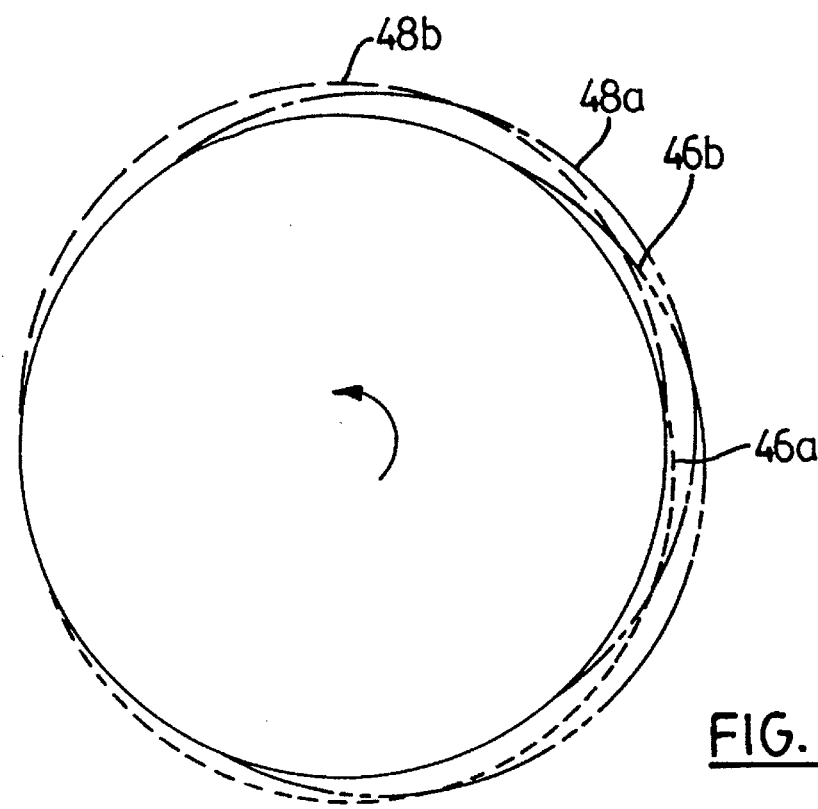
FIG. 7a is a schematic view of the portion illustrated in FIG. 7.

A cam means in the form of a cam assembly 40 is provided inside the fixture member and has a cam surface 42 adjacent the second surface 38d. The cam assembly 40 is fixed to a shaft 44 which is arranged to rotate about a central first axis corresponding to the central axis of the arcuate member and is operable in a plane perpendicular with the first axis. Referring to FIGS. 7 7a, the cam assembly 40 further includes first and second cam members 46, 48 spaced by a spacer member 50, which is aligned with the web portion 12 and wherein the first and second cam members 46, 48 are aligned with a respective one of the outer shoe portions 14, 16 of the brake shoe. Referring to FIG. 7, each cam member has a pair of cam elements 46a, 46b, 48a, 48b. Each cam elements is aligned with one row of rivets and are spaced by a spacer portion 46c, 48c. It will be seen that the cam elements are offset or staggered for each cam member so that the pins driven for example by cam element 48b are displaced first, followed by the pins driven by cam element 48a, followed thereafter the pins driven by cam elements 46b and 46a respectively.

Figure 2:
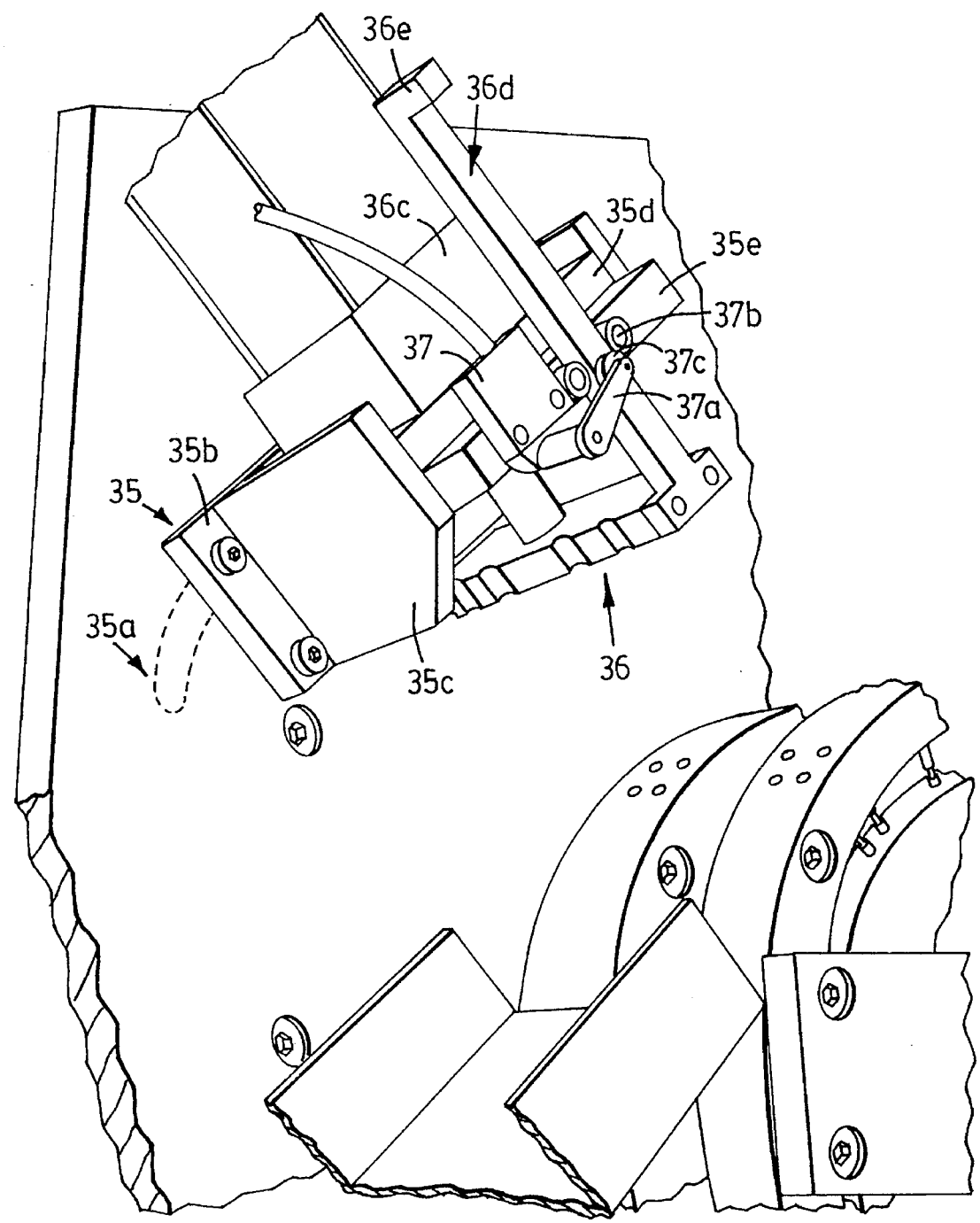
FIG. 2 is an enlarged fragmentary perspective view of a portion of the device illustrated in FIG. 1.
Figure 2A:
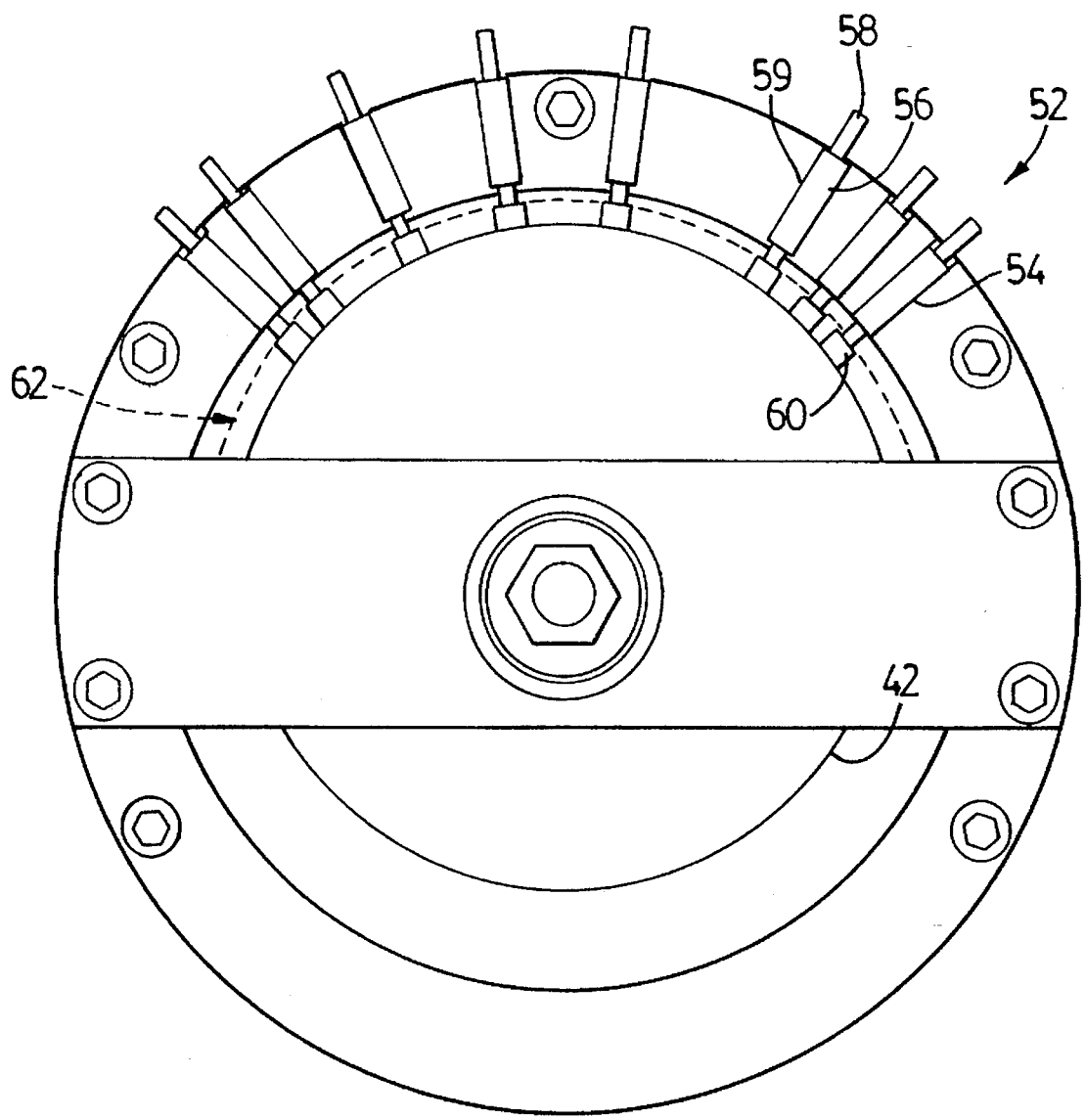
FIG. 2a is an enlarged front view of a portion of the device illustrated in FIG. 1.
Figure 3:
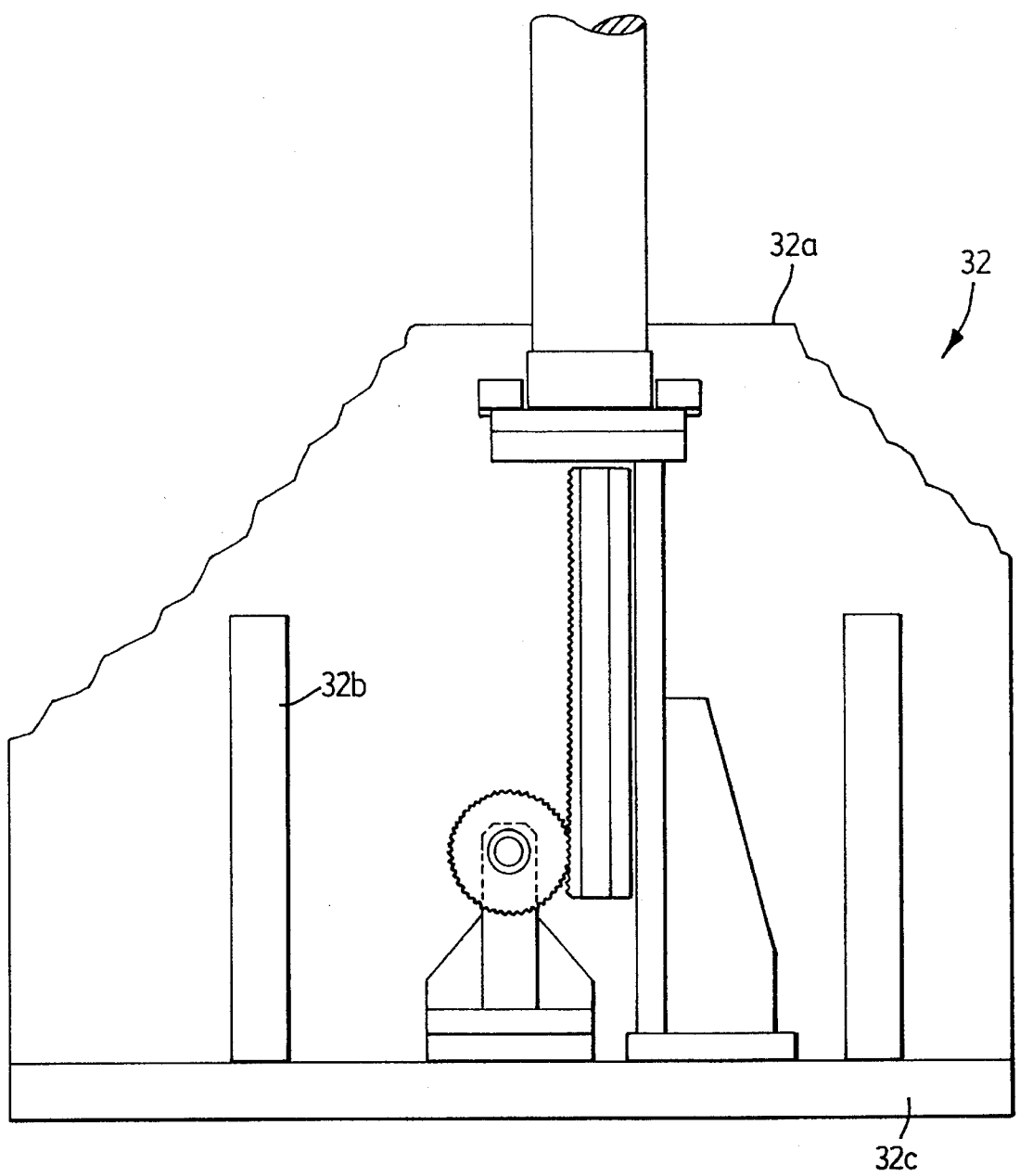
FIG. 3 is a rear fragmentary view of the device illustrated in FIG. 1.

The fixture means further includes a plurality of rivet extraction means shown generally at 52 in FIG. 2a each of the rivet extraction means 52 being arranged to align with a corresponding rivet in the brake shoe 10. In this embodiment, the fixture member has a number of passages 54 and each rivet extraction means 52 includes a sleeve 56 removably mounted in the passage 54 and an extraction pin 58 slidably mounted in the sleeve 56. Each passage 54 is arranged so that the pin 58 travels along an axis perpendicular to and passing through the axis of the shaft 44.

Each pin 58 has a relatively thick trunk section 59 and a head portion 60 extending beyond the second surface 38b for engagement with the cam surface of the corresponding cam member. Guide means in the form of a guide flange 62 is mounted on the outer surface of each spacer portion for engaging the head portions 60 thereby to maintain the head portion 60 in engagement with the cam surface 42 to retract the pin 58 during a predetermined range of return travel of the first cam member 46.

Figure 6:
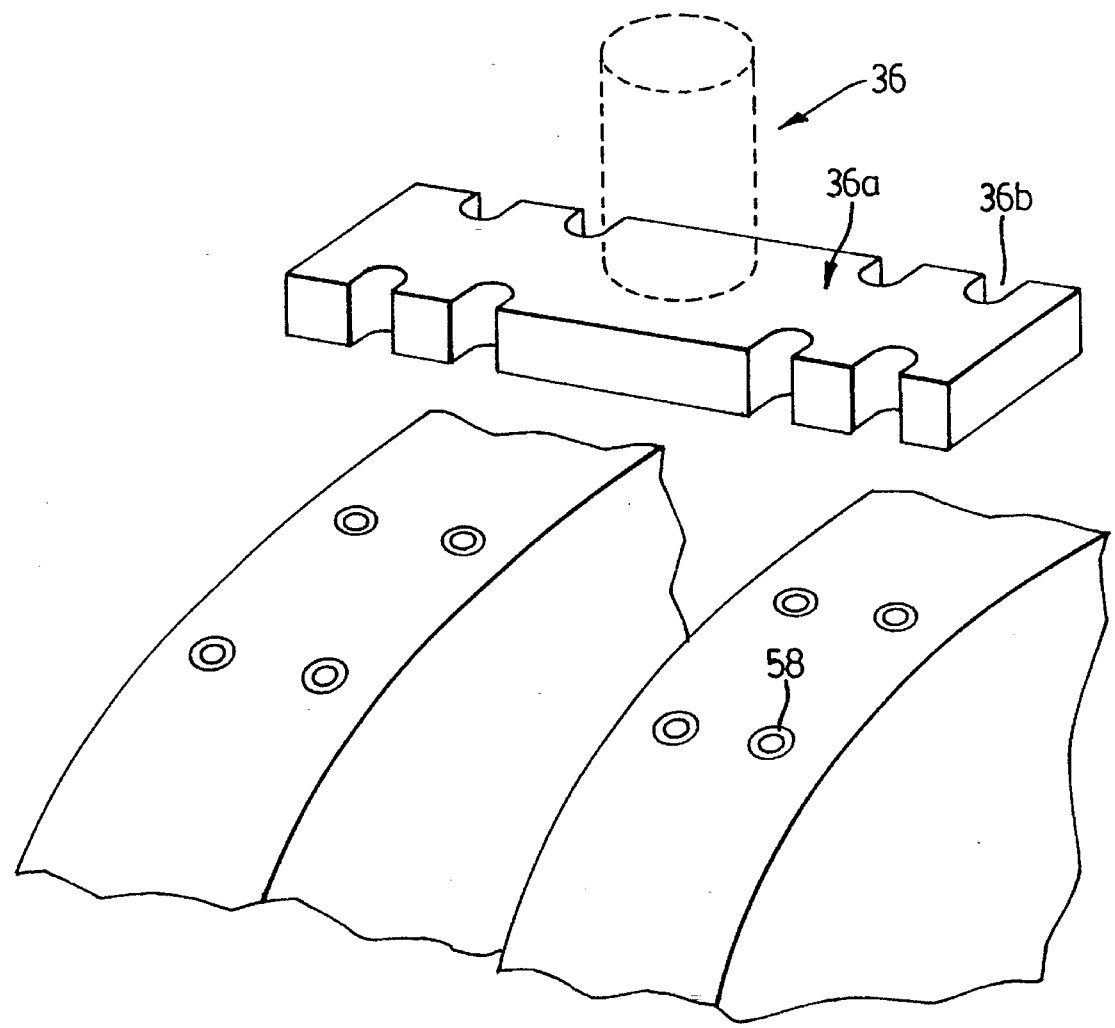
FIG. 6 is a fragmentary perspective view of another portion of the device illustrated in FIG. 1.

Referring to FIG. 6, each ram 36 of the clamping means is provided with an anvil 36a with a number of passages 36b along its periphery. The dimensions of the anvil and the passages are arranged so that the anvil may be engaged with the entire width of the brake shoe while not interfering with the rivet extraction pins 58.

Figure 4:
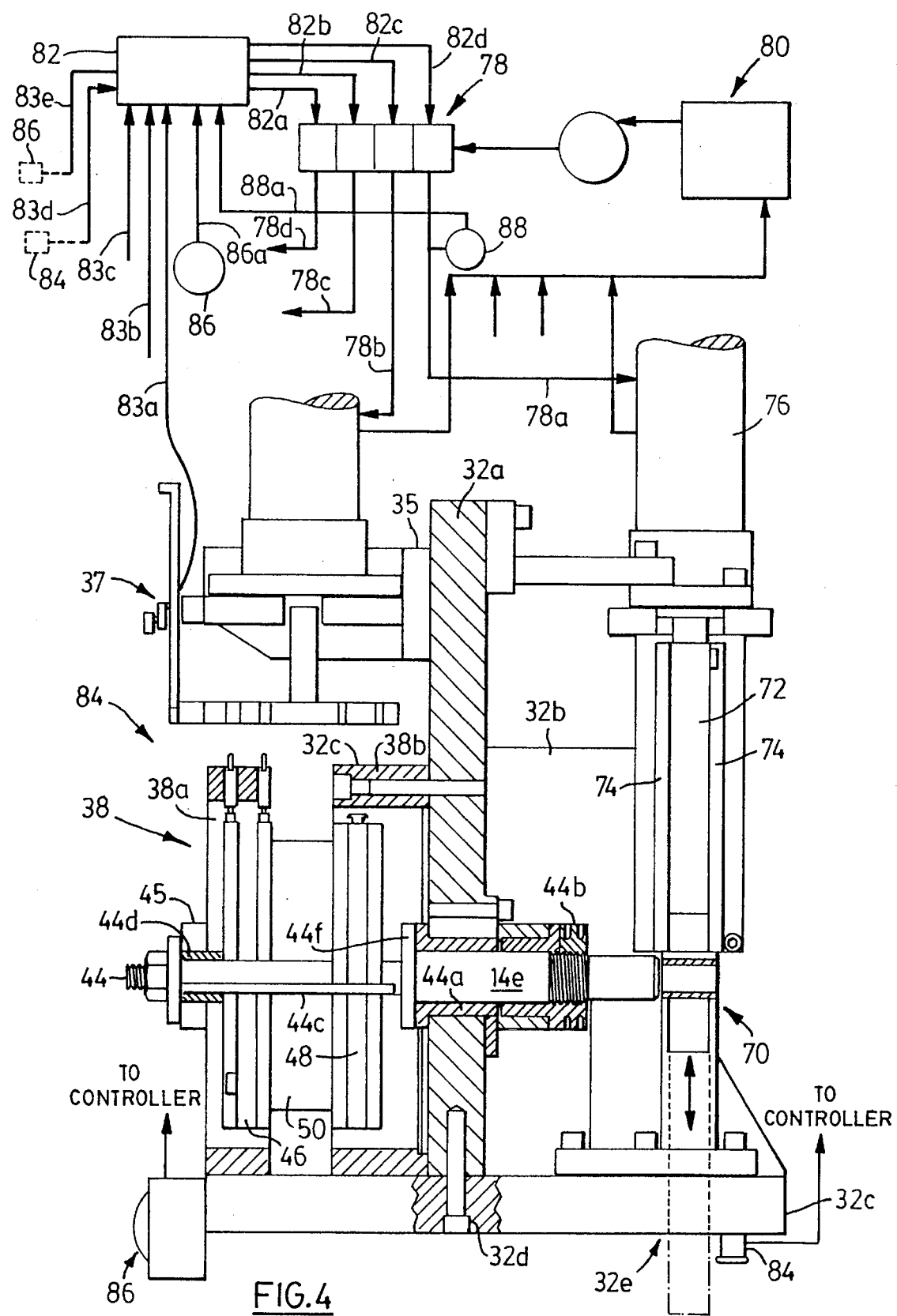
FIG. 4 is a fragmentary part-schematic view taken on line 4—4 of FIG. 1.

Referring to FIG. 4, the frame assembly includes a back plate 32a and a pair of rear supports 32b, all of which are secured to a base plate 32c by way of threaded fasteners. The shaft is supported on the back plate by way of a bearing unit 44a and a lock nut 44b. The cam assembly is keyed to the shaft by the key shown at 44c and the dimensional tolerances between the shaft and the cam assembly are sufficiently close to ensure a force fit therebetween. The shaft is further formed with a thickened midsection 44e and a flange 44f, the latter of which works with the lock nut to hold the shaft in position relative to the back plate.

The end of the shaft 44 adjacent the cam assembly is supported by the fixture member 38 with a bushing element therebetween at 44d. The bushing is held within a cross member 45, itself secured to the periphery of the fixture member 38, thereby allowing the shaft to rotate relative to the stationary fixture assembly, itself secured to the base plate. The shaft extends through the back plate and terminates at a pinion element 70. Aligned with the pinion element 70 is a vertically oriented rack element 72 supported by a linear bearing assembly 74. Driving the rack element is a hydraulic ram 76. The rack element is movable downwardly toward and through a passage 32e formed in the base plate 32c to allow the full length of the rack element to be used to drive the pinion. The hydraulic ram 76, along with the rams 36 driving the anvils are controlled by a hydraulic valve unit 78 which is fed by a hydraulic pump reservoir unit 80.

The valve assembly 78 is joined with the ram 76 by way of line 78a and with the rams 36 by way of lines 78b, 78c and 78d. In turn, the return lines 80a, 80b, 80c and 80d join the rams 76 and 36 with the reservoir 80 to complete the hydraulic circuit.

Referring to FIGS. 1a and 2, each ram 36 is mounted on the back plate 32a by way of a brace 35, itself held against the back plate by removable fasteners. If desired, the brace may be made adjustable by way of adjustment slots 35a, thereby permitting the anvils to be aligned with the new rivet pattern of a different brake shoe. The brace 35 includes a back plate 35b and a pair of outwardly extending support webs 35c. Extending between and joined to the webs 35c is a support plate 35d with a passage therethrough to receive the piston of each hydraulic ram 36. The hydraulic ram 36 has a base block 36a which is also fixed to the support plate.

Each anvil is provided with a positioning arm 36d which extends past a contact switch 37. The positioning arm ends with a jog 36e which is arranged to engage the contact arm 37a of the contact switch to register the extension of the ram to a position with the anvil firmly on the brake shoe. The brace further incudes a cross member 35e secured to the support webs 35c and carries both the contact switch 37 and a pair of positioning wheels 37b to guide the positioning arm. The contact switch is well known and has a wheel 37c mounted on its remote end to engage the job. Referring to FIG. 1, the middle ram is further provided with a protective shield 43 which is mounted on a pair of lateral extensions 36f of the positioning arm 36d.

Referring to FIG. 4, a controller 82 is also provided for monitoring the functioning of the device 10. The controller has a programmer controller unit such as that sold under the tradename OMRON. A number of contact switches, such as that shown at 37, are provided at 84 to monitor the arrival of the three anvils to their position on the upper surface of the brake shoe. A contact switch is also provided to monitor the arrival of the rack element to a fully extended position corresponding to the arrival of the cam assembly to a full displacement position. Finally, either one of a pair of activation buttons 86 may be depressed to activate the device.

The controller 82 conveys signals to valve the valve assembly, that is to the valve units controlling rams 36 and 76, by way of paths 82a to 82d. In addition, the controller receives signals from contact switches 37 by way of paths 83a to 83d and from the activation switches by way of a pair of paths, one of which is shown at 83e.

The device 10 may be operated in the following manner. First, a brake shoe is installed on the fixture assembly. One of the activation buttons may then be depressed causing the controller to open the valves controlling the supply of hydraulic fluid to the three rams 36, thereby causing the anvils to be displaced to a position against the outer convex surface of the brake lining. As each anvil reaches its appropriate destination, a respective contact element registers the arrival with the controller. When all three switches register arrival, the controller opens the valves controlling the supply of hydraulic fluid to the ram 76 causing the downward travel of the rack element and the resultant rotation of the pinion, in turn causing the corresponding rotation of the cam assembly in a counter-clockwise rotation as viewed in FIG. 1a.

Due to the relative offset of the cam elements, the cam element 48b first engages the pins near the two o'clock position of the brake shoe as viewed from FIG. 1a. As the cam element 48b progresses, so does the cam surface progressively upwardly causing each successive pin element in its path to be displaced upwardly. As a result, the pin is pressed against a corresponding rivet and under the action of the anvils, forces the rivet through the lining. As the cam element 48b progresses the cam element 48a follows at the two o'clock position and so on until all four cam elements have upwardly displaced all of the pins resulting in the extraction of all rivets holding the lining to the shoe.

the contact switch 84 registers the arrival of the cam assembly to its full rotation position and a signal is conveyed to that effect to the controller. As a result, the controller opens the valves causing the cam assembly to be returned to its ready position and the anvils to be returned to their ready position, leaving the lining, possibly in pieces, loose on top of the shoe. The lining may then be ejected along either reject chute 39. The operation to return the cam assembly to its ready position is governed by a timer 86 by way of path 86a.

Periodically, the force of the anvil against the shoe causes the shoe to jam into the fixture. In this case, the ejection device may be activated by downwardly depressing the link 41d of the ejection mechanism causing the block to be upwardly displaced forcing the web upwardly out of the fixture.

Due to the rugged environment of the device, periodically, an ejector pin will be broken or become worn. The device is arranged to permit the pins to be removed, simply by pulling the pin out of the sleeve from the top of the fixture assembly, without the need for further disassembly. Similarly, the sleeves are force fit into the passages and can be replaced by simply tapping them out.

Periodically, a brake shoe may be positioned improperly on the fixture assembly, causing the rivets of the brake shoe to be mismatched with the corresponding pins. As a result, some of the pins may in fact be aligned with the base of the shoe rather than a pin. To detect the presence of an improperly positioned brake shoe, a pressure sensor 88 is provided on the hydraulic line supplying the hydraulic ram 76 to sense a sudden increase in supply pressure as would occur if a pin were pressed against the steel base rather than the rivet. The sensor conveys a reset signal to controller 82 via path 88a in the presence of this sudden increase in supply pressure. For example, a normal hydraulic pressure needed to force a rivet from the shoe might be about 2500 psi. A misaligned pin might cause for example pressures as high as 2800 psi or higher until pin failure. Therefore, the sensor should detect pressures exceeding normal operating pressures, such as say 2600 pounds, while taking into account normal variations in rivet strength.

Referring to FIGS. 1 and 1a, the device may be incorporated into an assembly line by providing conveyors for both the shoes and the lining. For example, a conveyor 90 may if desired be located beneath the device to collect lining fragments from the fixture assembly. In this case, the device would be provided with passages 92 in the downward trajectory of the lining fragments from the fixture assembly in place of the reject chutes, along with a collection hopper to gather the fragments for delivery to the conveyor.

I claim:

1. A device for processing a brake element, comprising:

frame means;

fixture means supported by said frame means for locating a brake element, said brake element having an inner concave surface and an outer convex surface, said fixture means having a first surface to engage said inner concave surface;

clamping means for removably clamping said brake element to said fixture means;

said fixture means further comprising a plurality of rivet extraction means, each of said rivet extraction means being arranged to align with a corresponding rivet in said brake element;

said fixture means further comprising a second surface;

cam means providing a cam surface adjacent said second surface, each of said rivet extraction means being arranged to engage said cam means at said second surface;

wherein said cam means includes a first cam member and a shaft, said first cam member mounted on said shaft for rotation relative to said second surface, said shaft arranged to rotate about a central first axis, said cam means being operable in a plane perpendicular with said first axis.

2. A device as defined in claim 1 wherein said fixture means includes an arcuate fixture member, each of said rivet extraction means being arranged to displace along an axis perpendicular to and passing through said first axis.

3. A device as defined in claim 2 wherein said fixture member has a number of passages formed therein, each of said rivet extraction means including a sleeve removably mounted in a respective passage and an extraction pin slidably mounted in and removable from said sleeve.

4. A device as defined in claim 3 wherein said pin has a head portion extending beyond said second surface for engagement with said first cam member.

5. A device as defined in claim 4 further comprising guide means formed on said cam surface for engaging said head portion thereby to maintain said head portion in engagement with said cam surface thereby to retract said pin during a predetermined range of return travel of said first cam member.

6. A device as defined in claim 5 wherein said brake element is a brake shoe comprising a central web portion and two outer rivet-containing shoe portions, each on a corresponding side of said web portion, further comprising a second cam member, wherein said first and second cam members are aligned with a respective one of said outer shoe portions.

7. A device as defined in claim 6 further comprising a spacer member, said first and second cam members being spaced by said spacer member, said spacer member being further arranged to receive said web portion.

8. A device as defined in claim 7 wherein each of said first and second cam members includes a pair of cam elements, each of which being aligned with one row of rivets in said brake shoe.

9. A device as defined in claim 8 wherein said cam elements are staggered relative to one another so that said rivets may be extracted one-by-one by said cam means during the travel of said cam means.

10. A device as defined in claim 7 wherein said clamping means includes a plurality of anvils, each of which is arranged to engage said brake shoe while not interfering with said plurality of rivet extraction means.

11. A device as defined in claim 10 wherein each of said anvils is provided with a series of passages, the passages of said anvils being aligned with the passages of said fixture member to permit said pins to extend through said brake shoe without making contact with said anvils.

12. A technique for processing a brake element, comprising the steps of:

providing a frame;

supporting a fixture by said frame for locating a brake element, said brake element having an inner concave surface and an outer convex surface;

providing said fixture with a first surface to engage said inner concave surface;

removably clamping said brake element to said fixture;

providing in said fixture a plurality of rivet extraction elements, and arranging each of said extraction elements to align with a corresponding rivet in said brake element;

providing said fixture with a second surface;

providing a first cam member and a shaft, said first cam member mounted on said shaft for rotation relative to said second surface, and having a cam surface adjacent said second surface;

arranging said rivet extraction elements for engagement with said first cam member at said second surface;

rotating said shaft about a central first axis, causing said first cam member to rotate in a plane perpendicular with said first axis such that said cam surface engages with said rivet extraction elements at said second surface to press said rivet extraction elements against corresponding rivets in said brake element, to thereby force said rivets from said brake element.

13. A technique as defined in claim 12 wherein said fixture includes an arcuate fixture member, further comprising the step of arranging each of said rivet extraction elements to displace along an axis perpendicular to an passing through said first axis.

14. A technique as defined in claim 13 further comprising the step of;

providing said fixture member with number of passages; and providing each of said rivet extraction elements with a sleeve removably mounted in a respective passage and an extraction pin slidably mounted in and removable from said sleeve.

15. A technique as defined in claim 14 further comprising the step of providing each of said pins with a head portion extending beyond said second surface for engagement with said first cam member.

16. A technique as defined in claim 15 further comprising the step of providing a guide on said cam surface for engaging said head portion and maintaining said head portion in engagement with said cam surface to retract said pin during a predetermined range of return travel of said first cam member.

17. A technique as defined in claim 16 wherein said brake element is a brake shoe comprising a central web portion and two outer rivet-containing shoe portion, each on a corresponding side of said web portion, further comprising the step of providing a second cam member, wherein said first and second cam members are aligned with a respective one of said outer shoe portions.

18. A technique as defined in claim 17 further comprising the step of providing a spacer member to space said first cam member from said second cam member, said spacer member being further arranged to receive said web portion.

\* \* \* \* \*